Feb. 18, 1930.  E. BERTONE  1,747,693
FLEXIBLE SHAFT
Original Filed Jan. 27, 1927   2 Sheets-Sheet 1
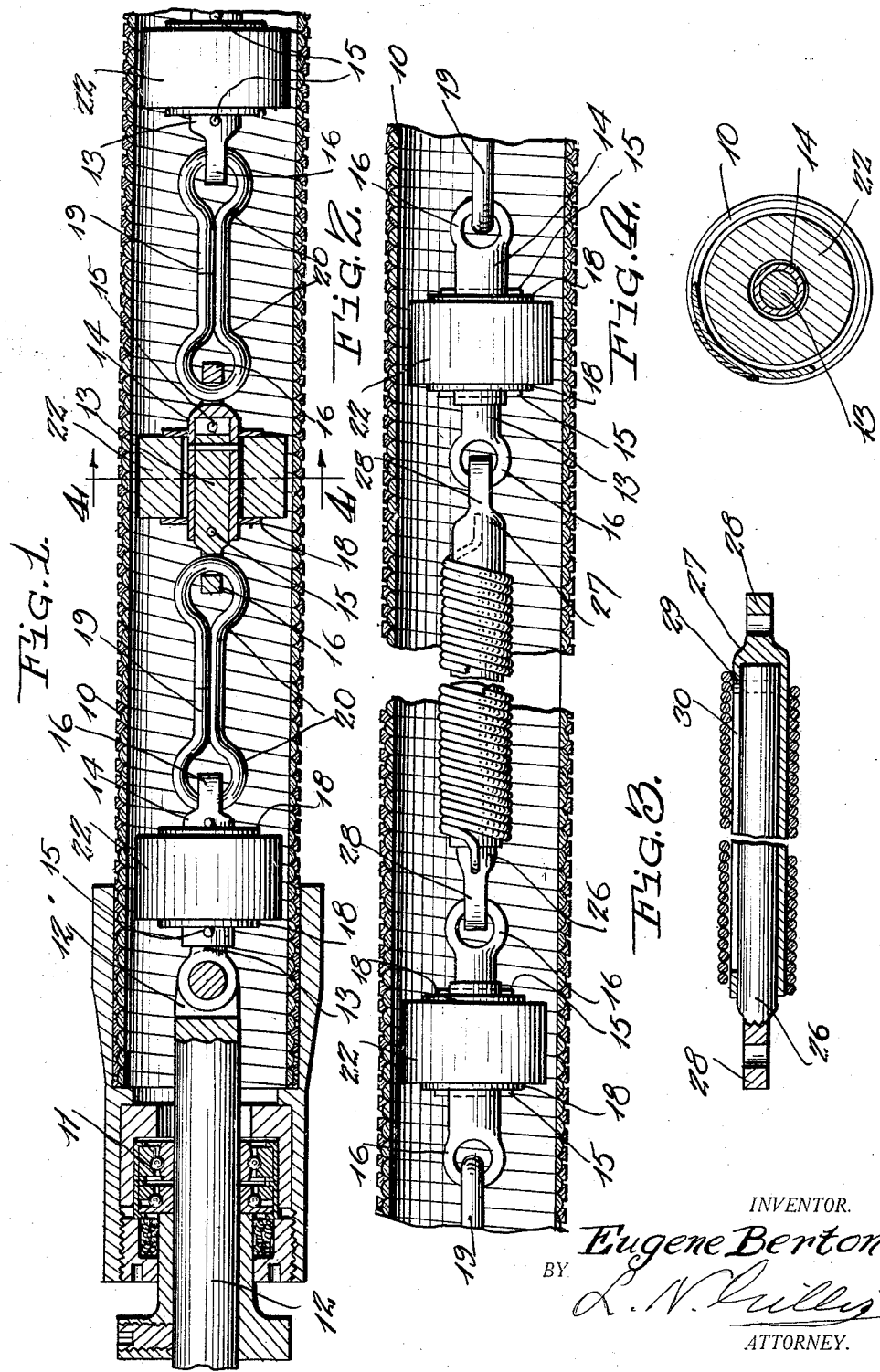
INVENTOR.
Eugene Bertone.
BY
ATTORNEY.

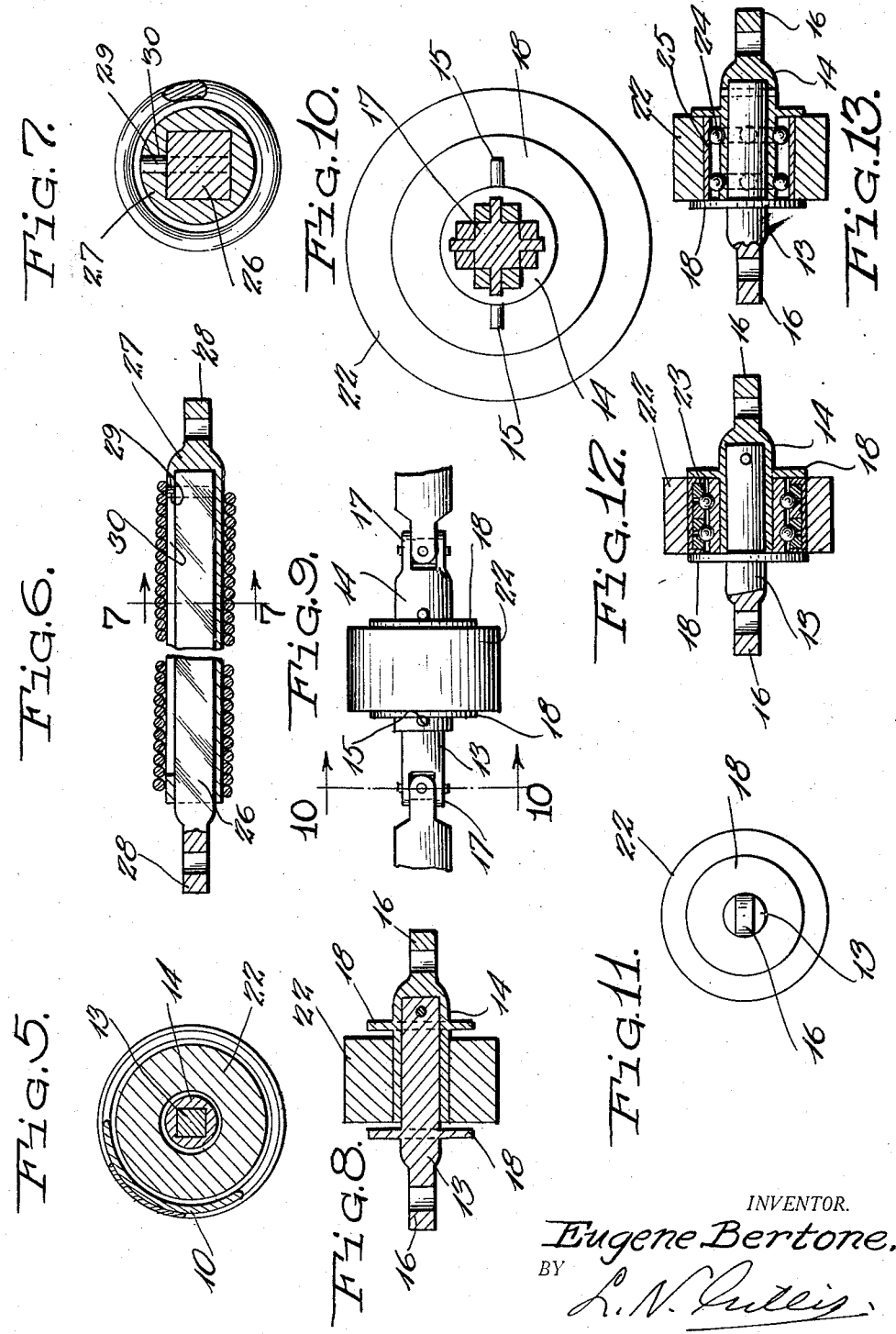

Patented Feb. 18, 1930

1,747,693

UNITED STATES PATENT OFFICE

EUGENE BERTONE, OF STEVENSON, MARYLAND

FLEXIBLE SHAFT

Application filed January 27, 1927, Serial No. 163,900. Renewed July 22, 1929.

This invention relates to flexible shafting and has special reference to improvements in the flexible shafting shown and described in my copending application for patent Serial Number 106,059, filed May 1, 1926.

One important object of the invention is to provide an arrangement of such shafting by means of which one piece anti-friction rollers may be mounted on certain of the links and readily replaced if broken or worn.

A second important object of the invention is to provide an improved and novel arrangement of link for a chain shaft, the link being so constructed that it may be separated into two parts for replacement or repair of any part of the chain.

A third important object of the invention is to provide a novel form of telescopic link for a chain of this class.

A fourth important object of the invention is to provide an improved arrangement of means for maintaining a constant tension on the flexible drive means of such shafting so that such drive means will be prevented from kinking.

A fifth important object of the invention is to provide an improved spring tension means wherein all torsional effect on the tension spring is eliminated.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a longitudinal section on one end of the casing showing a portion of the chain shafting in elevation therein.

Figure 2 is a similar view of the other end of the shafting and disclosing the improved tensioning means.

Figure 3 is a longitudinal section through one form of the tensioning device.

Figure 4 is a section on the line 4—4 of Figure 1.

Figure 5 is a section similar to Figure 4 but showing a modified form of the device.

Figure 6 is a section similar to Figure 3 but showing a modification similar to Figure 5.

Figure 7 is an enlarged section on the line 7—7 of Figure 6.

Figure 8 is a longitudinal section through a second modification of a link used herein.

Figure 9 is a side view of a portion of the chain driving shaft in a modified form.

Figure 10 is an enlarged section on the line 10—10 of Figure 9.

Figure 11 is an end view of a further modification of the link used in this invention.

Figure 12 is a diametrical section through this last form.

Figure 13 is a further section similar to Figure 12 showing a still further modification.

In the embodiment of the invention here shown there is provided an outer flexible tube or casing 10 of any preferred construction and at each end this tube is provided with a bearing 11 preferably of the type shown in my copending application aforesaid but which may be of any type desired. It is not deemed necessary to describe this bearing in detail as the same has already been fully set forth in said prior application. It is sufficient to state that each bearing supports a short shaft 12 having an end 12' formed for connection to the terminal link of the chain shaft which forms the principal subject matter of the present invention.

This shaft includes a series of links each of which consists of an inner telescopic member 13 and an outer telescopic member 14 wherein the member 13 fits. These members, when assembled are held from relative longitudinal movement by one or more pins 15 passing diametrically through both members and the remote ends of the members may be provided with eyes 16 for connection to adjacent links of the chain or these members may be connected to the adjacent links by universal joints 17 as in the form shown in Figures 9 and 10. As seen in Figure 1 the inner member 13 is arranged to stop against one of the pins 15 when inserted to enable the opening for the other pin to properly register without difficulty. The members 13 and 14 may be cylindrical as shown in Figure 1 or they may be square in cross section of the inter-fitting portions as shown in Figure 5, the pins taking the torque in the former case while the pins are relieved from torque in the latter instance.

On each of the links is mounted a pair of spaced collars or washers 18 which may be in the form of loose members held in position by the pins as in Figures 1 and 2 or may be formed integrally with the members as shown in Figure 8, the latter form being preferable when the members 13 and 14 are drop forged.

Although the links may be connected directly together it is preferred that intermediate links 19 formed of wire or bar metal of high tensile and torsional strength be used to connect the main links, eyes 20 being formed at the ends of the links 19 for engagement with the eyes 16. Preferably, after the links are assembled the metal of the links 19 is welded or brazed to prevent opening of these links.

On each of the main links there is revolubly mounted an anti-friction roller 22 which may either be a solid roller as shown in Figures 1 and 4 or may have a preassembled ball bearing 23 inserted therein as shown in Figure 12. Also, the construction shown in Figure 13 may be used wherein the outer member 14 is circumferentially grooved or slotted to receive the balls 24 which are held in position by a liner 25 fitted within the roller 22. It is to be noted that the wearing portion or outside of these rollers is preferably formed from hard fibre or other suitable material.

In order to keep the chain under tension and thus to relieve the tendency to kink one of the links is made special and while it still consists of inner and outer telescopic members 26 and 27 having connecting eyes 28 at their ends these members have limited longitudinal sliding movement which is permitted by a pin 29 fixed to one of the members and moving in a longitudinal slot 30 in the other. These members are constantly urged to inwardly telescoped position by a coiled tension spring 31 surrounding the members and having its respective ends connected to the respective members near their eyes. This special link is preferably longer than the others, being say four or five inches long. By this means constant tension is maintained on the drive chain.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a flexible shaft, a link consisting of a pair of telescopically united sections, one of said sections having a bore of polygonal cross section and the other section having a body corresponding to and fitting in said bore, a cross pin extending across the first section adjacent the inner end of the bore and forming a stop for the other section, and a second cross pin extending through both sections and holding the sections from relative longitudinal movement.

2. In a flexible shaft, a link consisting of a pair of telescopically united sections, a cross pin extending across the first section adjacent the inner end of the bore and forming a stop for the other section, and a second cross pin extending through both sections and holding the sections from relative longitudinal movement.

3. In a flexible shaft, a link consisting of a pair of telescopically united sections, one of said sections having a bore of polygonal cross section and the other section having a body corresponding to and fitting in said bore, means to hold said sections releasably from longitudinal movement with respect to each other, and a roller revolubly mounted on the outer section.

4. In a flexible shaft, a link consisting of a pair of telescopically united sections, one of said sections having a bore of polygonal cross section and the other section having a body corresponding to and fitting in said bore, a cross pin extending across the first section adjacent the inner end of the bore and forming a stop for the other section, a second cross pin extending through both sections and holding the sections from relative longitudinal movement, and a roller revolubly mounted on the outer section.

5. In a flexible shaft, a link consisting of a pair of telescopically united sections, a cross pin extending across the first section adjacent the inner end of the bore and forming a stop for the other section, a second cross pin extending through both sections and holding the sections from relative longitudinal movement, and a roller revolubly mounted on the outer section.

6. In a flexible shaft, a link consisting of a pair of telescopically united sections, one of said sections having a bore of polygonal cross section and the other section having a body corresponding to and fitting in said bore, a cross pin extending across the first section adjacent the inner end of the bore and forming a stop for the other section, a second cross pin extending through both sections and holding the sections from relative longitudinal movement, a roller revolubly mounted on the outer section, and a pair of washers each loosely mounted on said outer section and positioned between the roller and a respective cross pin whereby the cross pins form limit stops for said washers.

7. In a flexible shaft, a link consisting of a pair of telescopically united sections one of which is provided with a bore wherein the other section fits, a cross pin extending across the first section adjacent the inner end of the bore and forming a stop for the other section, a second cross pin extending through both sections and holding the sections from relative longitudinal movement, a roller revolubly mounted on the outer section, and a pair of washers each loosely mounted on said outer section and positioned between the roller and a respective cross pin whereby the cross pins form limit stops for said washers.

8. In flexible shafting, an outer flexible casing, an inner flexible shaft including a series of links inter-connected for universal angular movement with respect to each other, means to support the end members of said shaft rotatably at the ends of the casing and preventing longitudinal movement of said end members with respect to the casing; and means to keep the shaft constantly under tension between said end members comprising a tension member included in the series of links and consisting of inner and outer members telescopically united, means to permit limited telescopic movement of said members relative one to the other and to prevent rotation of said members with respect to each other, and a tension spring surrounding the outer member and having one end connected to one of the members and its other end connected to the other of said members and urging the members together.

9. In flexible shafting, an outer flexible casings, an inner flexible shaft including a series of links inter-connected for universal angular movement with respect to each other, means to support the end membrs of said shaft rotatably at the ends of the casing and preventing longitudinal movement of said end members with respect to the casing; and means to keep the shaft constantly under tension between said end members comprising a tension member included in the series of links and consisting of inner and outer members telescopically united, one of said members having a longitudinal slot and the other member carrying a pin fixed thereto and projecting into said slot, and a tension spring surrounding the outer member and having one end connected to one of the members and its other end connected to the other of said members and urging the members together.

10. A tension device for the chains of flexible shaftings and including a link having telescopically united inner and outer members provided with link connecting means at their outer ends, said members being provided with means to permit limited telescopic movement with respect to each other and preventing rotation of said members with respect to each other, and spring means urging the remote ends of said members toward each other.

11. A tension device for the chains of flexible shaftings and including a link having telescopically united inner and outer members provided with link connecting means at their outer ends, said members being provided with means to permit limited telescopic movement with respect to each other and preventing rotation of said members with respect to each other, and a coiled tension spring surrounding the outer member between the remote ends and having its ends connected respectively to said members adjacent the respective remote ends.

12. In flexible shafting, an outer casing and an inner chain drive shaft provided with means for preventing the drive shaft from contacting with the casing whereby to prevent overheating of the shafting and whereby to prevent wear of the casing by the drive chain and eliminate friction and means to maintain a constant tension on the chain whereby to eliminate tendency to kink.

In testimony whereof I affix my signature.
EUGENE BERTONE.